(12) United States Patent
Givens

(10) Patent No.: US 6,230,436 B1
(45) Date of Patent: May 15, 2001

(54) PLANT COVER

(76) Inventor: Janice I. Givens, 909 N. 100 E., Wabash, IN (US) 46992

( * ) Notice: Subject to any disclaimer, the term of this patent is extended or adjusted under 35 U.S.C. 154(b) by 0 days.

(21) Appl. No.: 09/362,396

(22) Filed: Jul. 28, 1999

(51) Int. Cl.[7] .................................................. A01G 13/02
(52) U.S. Cl. .................................................. 47/28.1; 47/67
(58) Field of Search ................................ 47/26, 28.1, 31, 47/29, 67, 20, 66.6, 21, 2, 17; 135/90, 98, 20.1, 21, 16; D11/144; 362/154, 132; 211/85.29

(56) References Cited

U.S. PATENT DOCUMENTS

| | | | | |
|---|---|---|---|---|
| 74,879 | * | 2/1868 | Bartlett | 47/28.1 |
| 90,054 | * | 5/1869 | Searle | 135/90 |
| 97,259 | * | 11/1869 | Watson | 47/31 |
| D. 183,742 | * | 10/1958 | Howard | D6/513 |
| D. 240,262 | * | 6/1976 | Dalgaard-Hansen | D11/144 |
| 349,066 | * | 9/1886 | Stahl | 43/126 |
| 570,285 | * | 10/1896 | Kaufman | 135/88.04 |
| 935,057 | * | 9/1909 | Roberts | 47/22 |
| 949,620 | * | 2/1910 | Chastant | 135/98 |
| 1,011,017 | * | 12/1911 | Bevill | 47/28.1 |
| 1,518,434 | * | 12/1924 | Klein | 43/126 |
| 1,641,496 | * | 9/1927 | Kuhl | 119/246 |
| 1,712,324 | * | 5/1929 | Boyd | 47/28.1 |
| 1,780,950 | * | 11/1930 | Stevason | 47/31 |
| 3,383,814 | * | 5/1968 | Rowe | 52/83 |
| 3,706,160 | * | 12/1972 | Deibert | 47/21 |
| 3,939,607 | | 2/1976 | Spector . | |
| 3,950,637 | * | 4/1976 | Rodin | 362/154 |
| 4,117,630 | * | 10/1978 | Kalas | 47/67 |
| 4,194,319 | | 3/1980 | Crawford . | |
| 4,304,068 | | 12/1981 | Beder . | |
| 4,327,520 | | 5/1982 | Saxby et al. . | |
| 4,449,542 | * | 5/1984 | McSwain et al. | 135/98 |
| 4,679,350 | | 7/1987 | Banta . | |
| 5,090,155 | | 2/1992 | Rodgers . | |
| 5,341,593 | | 8/1994 | Foreman . | |
| 5,860,248 | * | 1/1999 | Peters | 47/67 |
| 5,930,948 | * | 8/1999 | Daniel | 47/26 |

FOREIGN PATENT DOCUMENTS 544647 2/1932 (DE) .

* cited by examiner

Primary Examiner—Peter M. Poon
Assistant Examiner—Son T. Nguyen
(74) Attorney, Agent, or Firm—Susan L. Firestone; Paul W. O'Malley

(57) ABSTRACT

The invention is a plant cover used to protect a plant from intense sunlight. The plant cover has a rigid frame with a shade and is typically used for hanging planters. The plant cover can be further adjusted to select the type of light exposure.

11 Claims, 6 Drawing Sheets

PLANT COVER

BACKGROUND OF THE INVENTION

1. Field of the Invention

The invention relates to a rigid plant cover for planters.

2. Description of the Prior Art

Plants need a number of factors for optimal growth and health. Sun, wind and temperature affect the growth and health of a plant. Too much sun, for example, can lead to sunscald. Excessive sun exposure raises the temperature of the soil and the plant, contributing to increased water loss through evaporation from the soil and leaves. Increased water loss stresses the plant, leaving the plant susceptible to disease and insect infestation.

Planters, particularly hanging planters, are especially vulnerable to changes in factors relating to plant growth. Planters are exposed to the elements without having the modulating effect of the ground. They are often located in areas without shade, such as decks. Their pots do not have the water reserves found in the ground and dry out faster than the ground, often by evaporation through the exterior of the pot itself. To survive, the plant's water demand rises as the plant suffers an increased water loss through its leaves and evaporation from the pot. Potted plants cannot draw on water reserves like plants planted in the ground.

Young plants are especially sensitive to the elements. Young plants may not have an adequate root structure to draw enough water while under the stress of heat and sun. Young plants often require reduced sunlight as seedlings compared to a mature plant.

In the western and southern climates of the United States, many plants that flourish in the temperate Midwest, Pacific Northwest and East grow poorly, if at all. The intensity of the sun's rays and the differences in air humidity slow or prevent the growth of plants indigenous to other climates. The hostile environment compounds the difficulties in controlling the factors relating to growth.

In addition, gardeners often move indoor plants outside for the summer to take advantage of the growing season. Many such plants, however, are too fragile to survive the intense summer sun, especially when first moved outdoors. These plants may require additional shade before adapting to the change in environment.

Therefore, selectively controlling sun exposure modulates the plant's temperature and water loss. This decreases the stress on the plant and reduces the chance for disease and insect infestation.

One way of controlling sun exposure is shown in U.S. Pat. No. 4,194,319 for a plant support with a collapsible umbrella structure for hanging planters. The '319 support uses plastic or fabric panels to adjust the amount of light the plant receives. Rather than hanging from the center, pots hang from a collapsible lower frame member extending from a centrally located vertical support member to an upper frame member (or rib). Because the support teaches using a vertical support member, a pot cannot hang in the center. Furthermore, the position of the fully opened structure cannot be adjusted.

Durability, however, is an important factor for planters hanging outdoors. Summer storms are often violent. During summer storms, planters typically have little protection. Wind, rain, hail and flying debris especially batter a hanging planter. Therefore, a hanging planter must be durable to survive a storm's beating.

Collapsible umbrella structures like the one shown in '319 do not work well, especially for hanging planters. Because they must collapse, the frames are more fragile and less durable. The collapsible frame is easily damaged by storms and strong winds when fully extended. The chance of damage to the collapsible frame during a storm is high. Blowing in the wind, the dangling pots can start a harmonic effect on the frame caused by the blowing pots, which can weaken or break the frame.

Collapsible umbrella structures cannot have a rigid rim. A rigid rim would not allow the umbrella structure to fold. Without a rim, the edge of the shade panels are exposed to the elements and can easily tatter and fray over time.

Therefore, one object of the invention is to shade a plant from the full intensity of the sun's rays. Another object of the invention is to easily alter the amount of sunlight during different times of a plant's life. Another object of the invention is to develop a durable plant cover that can weather storms and winds.

SUMMARY OF THE INVENTION

The plant cover of the invention has a rigid frame. The frame has a rigid rim and rigid ribs disposed radially from the center of the frame at a frame apex to the rim. The frame supports a shade to reduce a plant's exposure to sunlight. The plant cover has a cover hanger extending from the apex. When used with a hanging planter, the plant cover also has a planter hanger extending from the apex of the frame. If desired, the angle of the plant cover can be adjusted to adjust the direction of the sunlight to which the plant is exposed.

Additional effects, features and advantages will be apparent in the written description that follows.

DETAILED DESCRIPTION OF THE INVENTION

Figure 1:
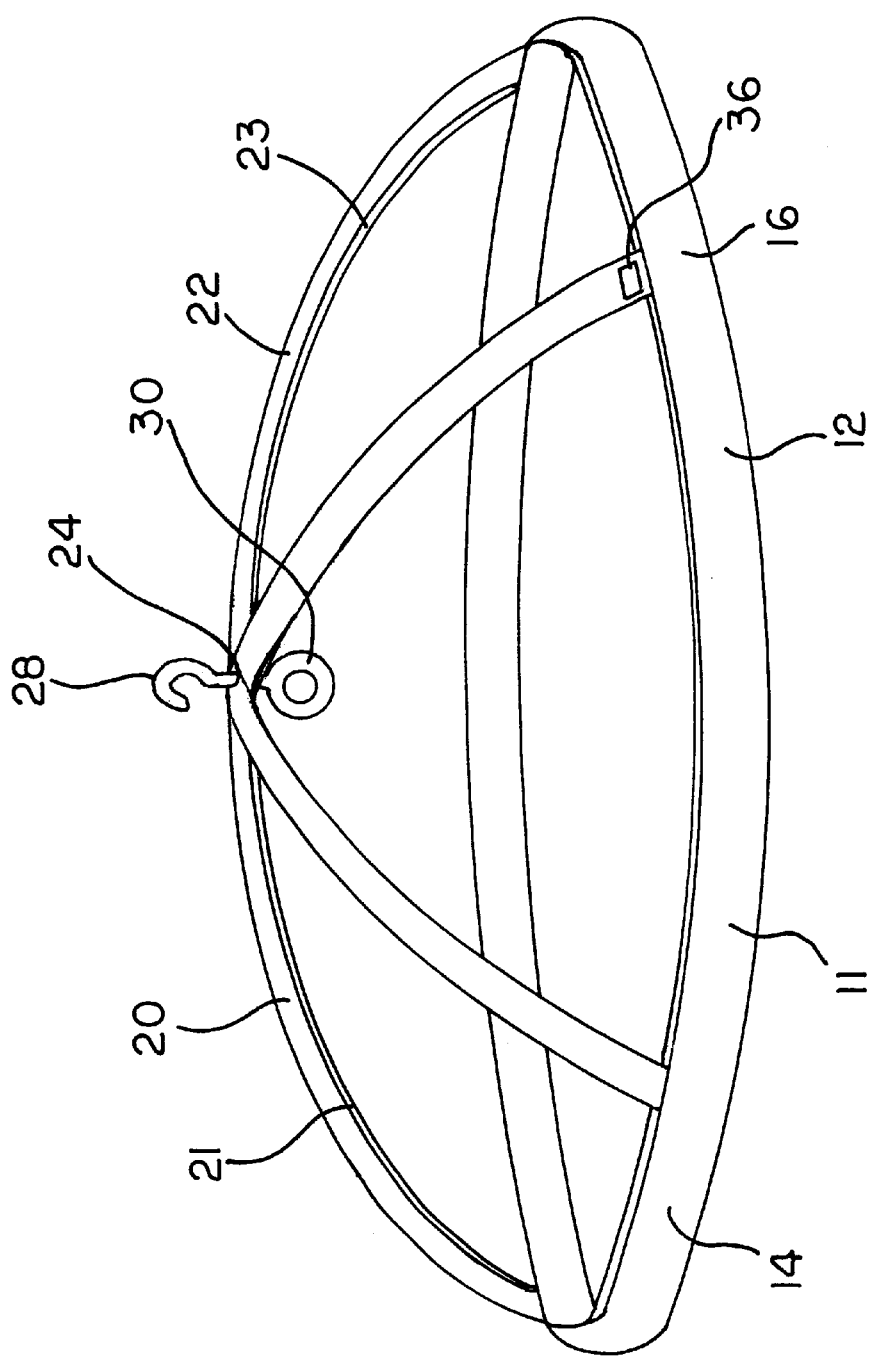
FIG. 1 is a perspective side view of one of the embodiments of the invention.
Figure 2:
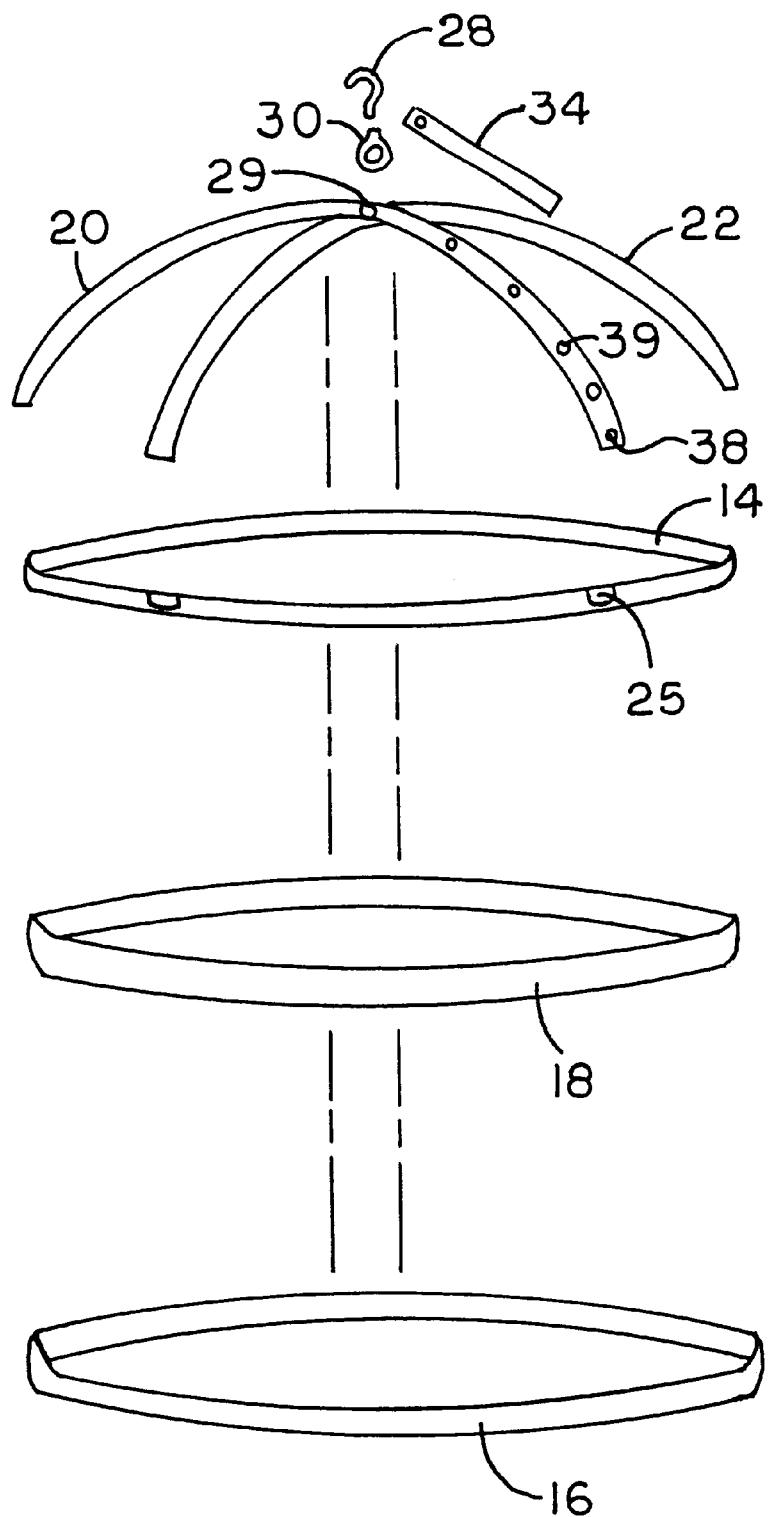
FIG. 2 is an exploded perspective side view of one of the embodiments of the invention.

Referring to the Figures where like reference numerals refer to like structures, plant cover has a noncollapsible frame 11 with a rigid rim 12. As shown in FIGS. 1 and 2, the rigid rim 12 can be formed by inner hoop 14 fitting within outer hoop 16. Preferably, gasket 18 fits tightly between inner and outer hoops 14,16. The gasket should be weather stable, such as an elastomer or elastomeric plastic.

Figure 3:
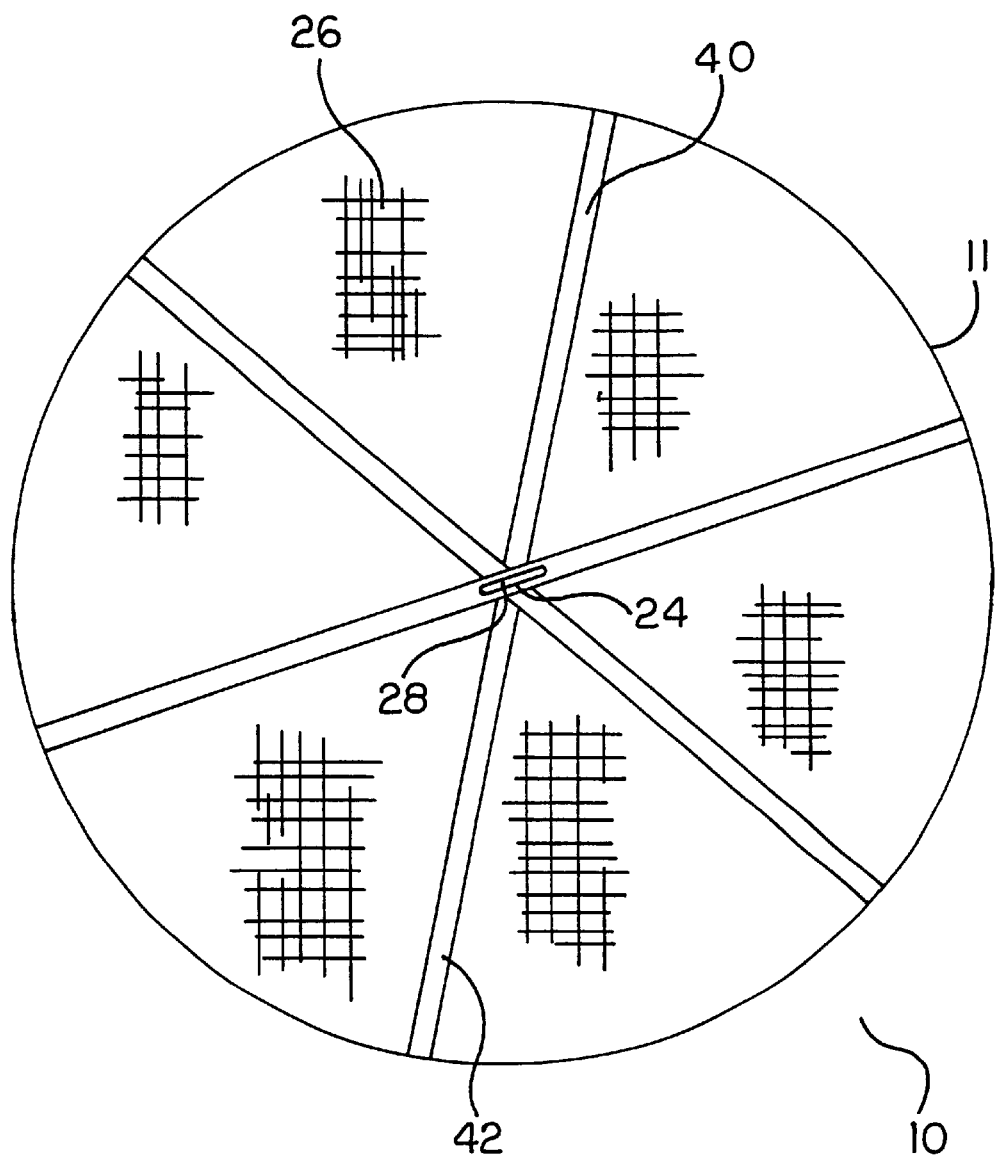
FIG. 3 is a top plan view of one of the embodiments of the invention.

Rigid ribs 20, 22 dispose radially from the center of the frame at apex 24 to the rim 12. The apex 24 is found on the central axis defined by the rim 12. Ribs 20, 22 extend from one side of the rim 12 to the other with the center of the rib passing through the apex 24. The ribs can be one piece 20,22 or two pieces 40,42 connected at and radially extending from the apex 24 to the rim 12 as shown in FIGS. 2 and 3 respectively. Another alternative shown in FIG. 1 has upper and lower ribs 20, 21, 22, 23 connected at apex 24. Preferably, the ribs are held in place at apex.

The ribs can fasten to the rim, such as by soldering, gluing, annealing and the like to inner hoop or outer hoop. Alternatively, they can be held in place by friction by tightly fitting the ribs 20, 22 between the inner and outer hoops 14, 16 with or without the gasket 18. The end of a rib may fit within a rim receiving recess 25 of a hoop as shown in FIG. 2.

The frame 11 is at least partially covered by a shade 26. The shade 26 reduces the amount of sunlight passing through it to the plant, preferably allowing at least some sunlight through it. The shade should also allow water penetration. The shade should be weather stable and resist degradation and bleaching in the sunlight. The shade can be fabric, plastic or metal. Preferably, the shade is a plastic or metal, such as mesh, netting or a molded plastic panel, which are more weather durable. A plastic shade is more preferred because it is durable, color tinted or painted, lightweight and inexpensive. The shade can be rigid, if desired. The amount of light a plant is exposed varies depending on the type of shade selected. A more open mesh or netting allows more light to penetrate the shade.

Figure 4:
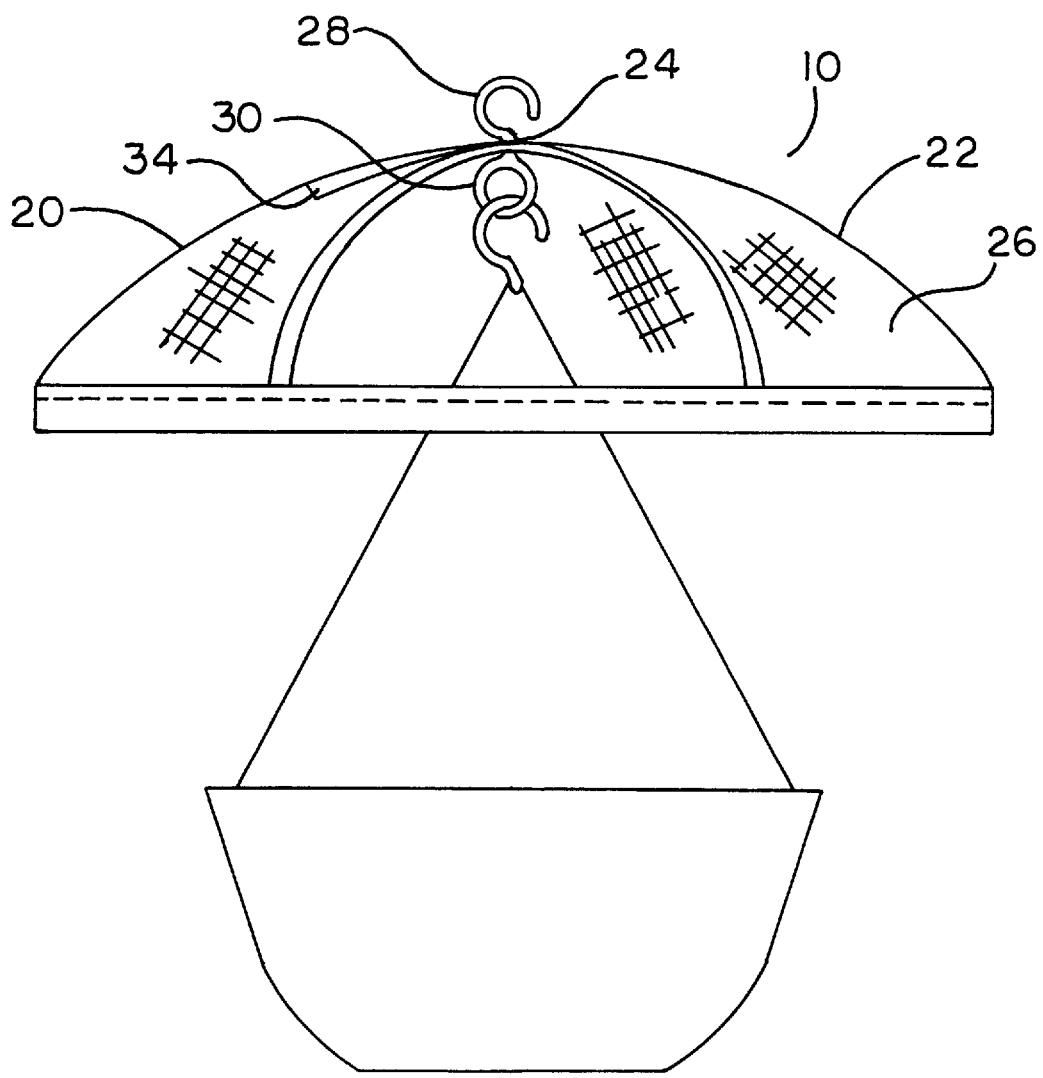
FIG. 4 is a side view of one of the embodiments of the invention.
Figure 5:
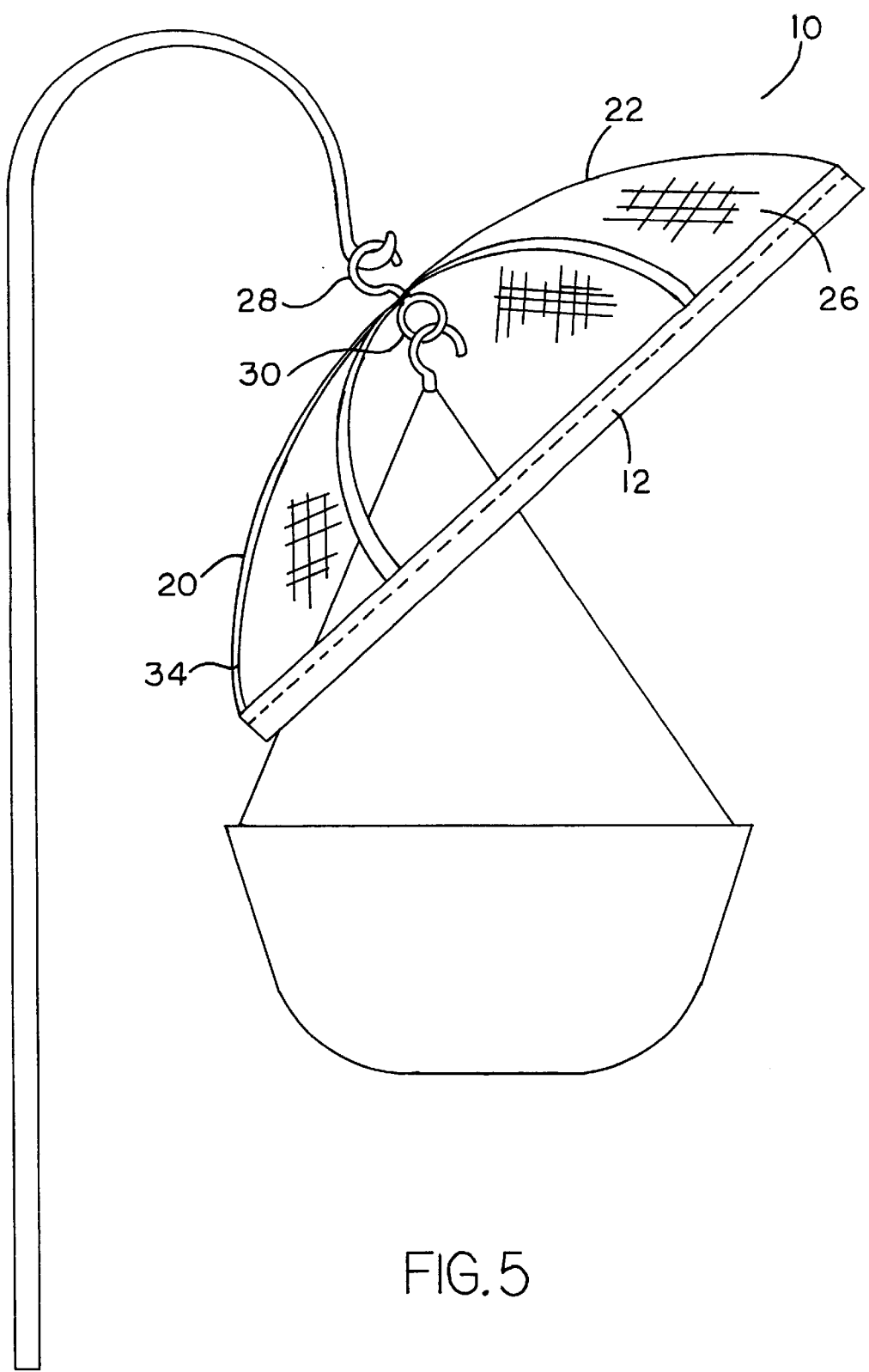
FIG. 5 is a side view of one of the embodiments of the invention in an alternative position.

The shade can be attached to the ribs or the rim or both by any conventional means, such as stapling, annealing, gluing, soldering and the like. At the rim, the ends of the shade can be sandwiched between inner and outer hoops with or without the gasket and fastened if desired as shown in FIGS. 4 and 5. If the shade tears in the configuration with inner and outer hoops, such as when a plastic or fabric netting is used, it is readily repaired by disassembling the rim and replacing the damaged shade with new shade material.

Plant cover 10 has a cover hanger 28 located at the apex 24. The cover hanger 28 can be attached at apex 24 to rib 20 or bolted or screwed through bore 29 which extends through the ribs. The latter secures the ribs at the apex. Plant cover 10 can also have a plant hanger 30 attached to the frame, preferably at apex 24. Plant hanger 30 and cover hanger 28 can cooperatively attach to hold the ribs together, such as by bolting or screwing through bore 29. The plant and cover hangers can be any type of hanger, such as a hook or loop. If the cover hanger and plant hanger disassemble from the frame, multiple frames can nest together during the winter to reduce their storage space requirement.

The angle of the plant cover can be changed from horizontal toward vertical, if desired. This can be done by using a moveable weight. The angle is adjusted by changing the position of the weight in relation to the apex. When the movable weight is either at the apex or removed from the cover, the cover remains horizontally aligned (FIG. 4). Placing the moveable weight on the plant cover in a location away from the apex changes the position of the cover from horizontal toward vertical (FIG. 5). Therefore, the farther the weight is from a frame center line through apex 24, the more tilted the plant cover.

The amount of light a plant is exposed to can thus vary depending on the angle of the cover. For example, some plants may not withstand a southern exposure, but can withstand the less intense sunlight from the east or west. By placing a moveable weight away from the apex and aligning the cover so the downward portion faces south, the plant is exposed to less sunlight, yet receives sufficient light from the east and west.

Figure 6:
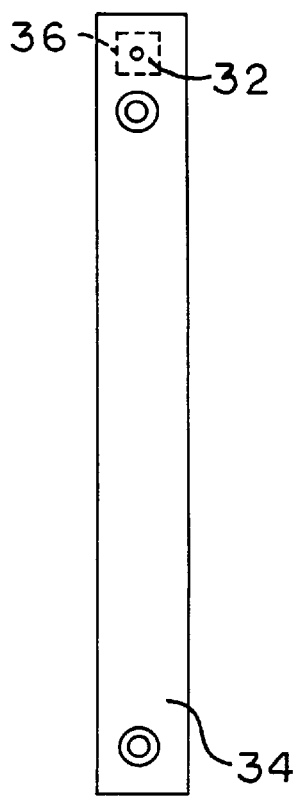
FIG. 6 is a detailed view of a moveable weight attached to a flexible strap.

Turning to FIG. 6, moveable weight 32 can be fastened to a flexible strap 34. The flexible strap can attach at one end at the apex with the weight fastened to the strap distal the apex when the cover is moved toward vertical. The strap can be located either at the frame's interior (FIGS. 4 and 5) or exterior (FIG. 2). Using interlocking fasteners attached to the distal end of the strap and the frame allows the adjustment of the cover's position by fastening the distal end with the weight to another position of the frame. The moveable weight can be fastened at the apex by attaching the distal end to the cover or planter hanger. Fasteners can include snaps, hooks, clasps, clips, buttons, buckles, ties, interlocking fastening tape and the like.

Figure 7:
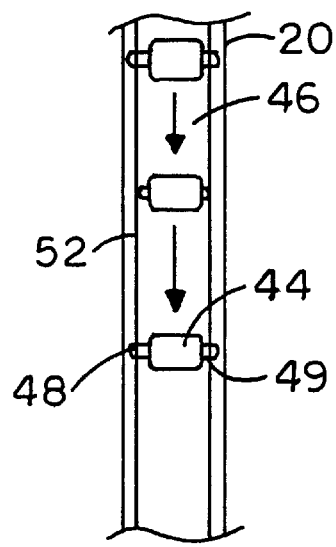
FIG. 7 is a detailed view of one rib of the invention.

FIG. 7 shows moveable weight 44 located on track 46 on rib 20. Moveable weight 44 locks into a position away from the apex. For example, moveable weight 44 has spring loaded buttons 48, 49 which contract into the body of the weight during movement and extend into notches or opening 50, 51 in the sides 52, 53 of track 46 at the apex and other locations on the track distal to the apex.

The frame is made of a rigid, weather durable material, such as plastic or metal. Any part of the frame can be molded by any method of plastic fabrication, such as molding the ribs and rim separately, then joining them by glueing or annealing. If desired, a plastic frame can be molded as a unitary structure. Similarly, the shade can also be molded with part or all of the frame as a unitary structure.

The plant cover of the invention has a number of advantages. The plant cover of the invention protects a plant from too much sun by attractively shading a planter. This allows the use of shade loving plants, such as fuschia, in areas with full sun exposure or the growth of more tender temperate plants in sunnier southern and western climates.

The position of the plant cover is easily adjustable to modulate sun exposure without moving a heavy planter. This allows the adjustment of sun exposure during different times of the growing season as the plant matures and adapts to the intensity of the sun. Seedlings, for example, may require shelter from the intense sunlight from a southern exposure while the mature plant does not.

In addition, the plant cover is durable to withstand stormy weather. The noncollapsible ribs will not be heavily damaged by strong winds and blowing debris. If the shade tears, it can be easily repaired or replaced. In addition, the use of a rigid rim protects the edge of the shade during exposure to the elements and prevents tattering and fraying over time.

While the invention is shown in only one of its forms, it is not thus limited but is susceptible to various changes and modifications without departing from the spirit and scope of the invention.

What is claimed is:

1. A plant cover comprising:

a frame having:

a rigid rim having an inner hoop fitting within an outer hoop;

an apex;

rigid ribs disposed radially from the apex to between the inner hoop and the outer hoop of the rigid rim;

a cover hanger extending from the apex; and shade means supported on the frame.

2. A plant cover of claim 1, further comprising;

a gasket fitting tightly between the inner and outer hoops.

3. A plant cover of claim 2, further comprising:

a planter hanger extending from the apex opposite the cover hanger.

4. A plant cover of claim 1, further comprising:

a receiving recess in the rim adapted to receive part of at least one rib.

5. A plant cover comprising:

a frame having:
   a rigid rim having an inner hoop fitting within an outer hoop;
   an apex;
rigid ribs disposed radially from the apex to the rigid rim;
a moveable weight;
a cover hanger extending from the apex;
shade means supported on the frame; and
wherein the angle of the plant cover can be adjusted from horizontal toward vertical by changing the position of the weight away from the apex.

6. A plant cover of claim 5, further comprising:

a gasket fitting between the inner and outer hoops.

7. A plant cover of claim 6, further comprising:

a planter hanger extending from the apex opposite the cover hanger.

8. A plant cover of claim 5, further comprising:

a receiving recess in the rim adapted to receive part of at least one rib.

9. A plant cover comprising:

a frame having;
   a rigid rim;
   an apex;
   rigid ribs disposed radially from the apex to the rigid rim;
a moveable weight;
a cover hanger extending from the apex;
shade means supported on the frame;
a flexible strap attached at one end at the apex;
the weight fastened to the strap distal the apex; and
wherein the angle of the plant cover can be adjusted by changing the position of the weight in relation to the apex.

10. A plant cover of claim 9, further comprising:

interlocking fasteners attached to the distal end of the strap and the frame.

11. A plant cover of claim 9, further comprising:

a receiving recess in the rim adapted to receive part of at least one rib.

* * * * *